United States Patent
Martalò et al.

(10) Patent No.: US 12,093,046 B2
(45) Date of Patent: Sep. 17, 2024

(54) METHOD FOR LOCATING A MOBILE TARGET IN AN AUTOMATED WAREHOUSE

(71) Applicant: E80 Group S.p.A., Viano (IT)

(72) Inventors: Marco Martalò, Viano (IT); Gianluigi Ferrari, Viano (IT); Gianmichele Verdano, Viano (IT); Simone Perri, Viano (IT); Francesco Monica, Viano (IT); Francesco De Mola, Viano (IT)

(73) Assignee: E80 GROUP S.P.A., Viano (IT)

( * ) Notice: Subject to any disclaimer, the term of this patent is extended or adjusted under 35 U.S.C. 154(b) by 402 days.

(21) Appl. No.: 17/598,722

(22) PCT Filed: Jan. 10, 2020

(86) PCT No.: PCT/IB2020/050184
§ 371 (c)(1),
(2) Date: Sep. 27, 2021

(87) PCT Pub. No.: WO2020/201837
PCT Pub. Date: Oct. 8, 2020

(65) Prior Publication Data
US 2022/0147048 A1     May 12, 2022

(30) Foreign Application Priority Data
Mar. 29, 2019  (IT) ................. 102019000004801

(51) Int. Cl.
| G05D 1/00 | (2024.01) |
| G01S 3/02 | (2006.01) |
| G01S 3/46 | (2006.01) |
| G01S 3/50 | (2006.01) |

(52) U.S. Cl.
CPC ............ *G05D 1/0212* (2013.01); *G01S 3/023* (2013.01); *G01S 3/46* (2013.01); *G01S 3/50* (2013.01); *G05D 1/0088* (2013.01); *G05D 1/0276* (2013.01)

(58) Field of Classification Search
None
See application file for complete search history.

(56) References Cited

U.S. PATENT DOCUMENTS

| 11,656,315 | B2* | 5/2023 | Stephens | ............... G01S 5/12 |
| | | | | 342/387 |
| 2015/0105103 | A1* | 4/2015 | Dackefjord | ............ G08B 21/24 |
| | | | | 455/456.2 |
| 2016/0291597 | A1* | 10/2016 | Monica | ............... G05D 1/0088 |
| 2019/0137617 | A1* | 5/2019 | Chapuis | .................. G01S 11/00 |

FOREIGN PATENT DOCUMENTS

| EP | 3076202 A1 | 10/2016 |
| EP | 3246728 A1 | 11/2017 |
| WO | 2020201837 A1 | 10/2020 |

OTHER PUBLICATIONS

"International Search Report and Written Opinion for PCT Patent Application No. PCT/IB2020/050184", Mailed Date: May 13, 2020, 11 pages.

\* cited by examiner

*Primary Examiner* — Todd Melton
(74) *Attorney, Agent, or Firm* — Tutunjian & Bitetto, P.C.

(57) ABSTRACT

The present invention relates to a method for managing an automatic warehouse and for locating a mobile target, such as a person or a manual guided vehicle (1).

21 Claims, 4 Drawing Sheets

METHOD FOR LOCATING A MOBILE TARGET IN AN AUTOMATED WAREHOUSE

CROSS-REFERENCE TO RELATED APPLICATIONS

This application is a national stage filing of PCT application No. PCT/IB2020/050184, filed Jan. 10, 2020, published as WO 2020201837, which in turn claims the benefit of priority to Italian patent application No. IT 102019000004801, filed Mar. 29, 2019. These applications are incorporated herein by reference.

TECHNICAL FIELD OF THE INVENTION

The present invention relates to a method for managing an automatic warehouse and for locating a mobile target, such as a person or a manual guided vehicle.

TECHNICAL BACKGROUND

Typically, the localization of mobile targets in industrial areas is carried out by arranging a plurality of fixed reference nodes, indicated as anchor nodes (or anchors) and equipped with antennas.

The target sends signals or beacons to the anchors, which detect such signals and send them to a centralised controller that uses the signals received to estimate the position of the target, for example by means of triangulation algorithms.

Such system requires the installation of reference nodes in the environment, with at least one antenna per node, in different positions, resulting in high installation costs and computational complexity in the management of communications between the devices in the warehouse. To this end, it is possible to consider more advantageous an illustrative example wherein, in place of the anchors distributed in the environment, 4 nodes are positioned on an AGV (Automatic Guided Vehicle) and the localization of the mobile target is carried out on the basis of a TWR (Two-Way Ranging) method between each node and the target, i.e. using the distances between each node and the target. Such a solution is taught for example in US20160291597.

The use of Time Difference of Arrival (TDoA) distributed measurements is taught in U.S. Pat. No. 7,170,441, according to which the beacon from the target is received by a plurality of anchors and the target position is estimated by extracting TDoA information through the beacon. Also in this case all the measurements coming from the plurality of receiving elements are used in a localization algorithm.

The use of localization using distributed measurement units is also taught in U.S. Pat. No. 9,623,558B1 to inhibit robots working in the vicinity of localized human operators. This patent proposes to triangulate the TWR-based estimates from the distributed wireless measurement units and to determine a region of interest in which the human operator can be present and at the same time inhibit the robotic unit.

Since in the presence of a greater number of transmitting and receiving antennas the complexity of a localization algorithm can rapidly increase, the US patent application published with number US20070005292 explores the idea of breaking down the problem into a sequence of very small subproblems, each of them solved through a relaxed semi-defined programming approach of a geometric optimization model. Subproblems can be generated based on a set of sensors/anchors selection rules and a list of priorities.

OBJECTS OF THE INVENTION

An object of the present invention is to provide a new method for the localization of a mobile target inside an automatic warehouse, such as a person or a manual guided vehicle.

Another object of the present invention is to provide a method as mentioned above which guarantees to avoid collisions between an AGV and mobile targets.

Another object of the present invention is to provide a method which allows to reduce the estimate of the error, while guaranteeing a reduction of the computational complexity in the presence of a large number of targets and anchors.

According to one aspect of the invention a method according to claim 1 is provided.

The dependent claims refer to preferred and advantageous examples of embodiments of the invention.

BRIEF DESCRIPTION OF THE DRAWINGS

Other features and advantages of the invention will be more apparent from the description of an exemplary embodiment of a method according to the present invention, illustrated by way of example in the accompanying drawings, wherein.

In the accompanying drawings, identical parts or components are distinguished by the same reference numerals.

EXEMPLARY EMBODIMENTS OF THE INVENTION

Figure 1:
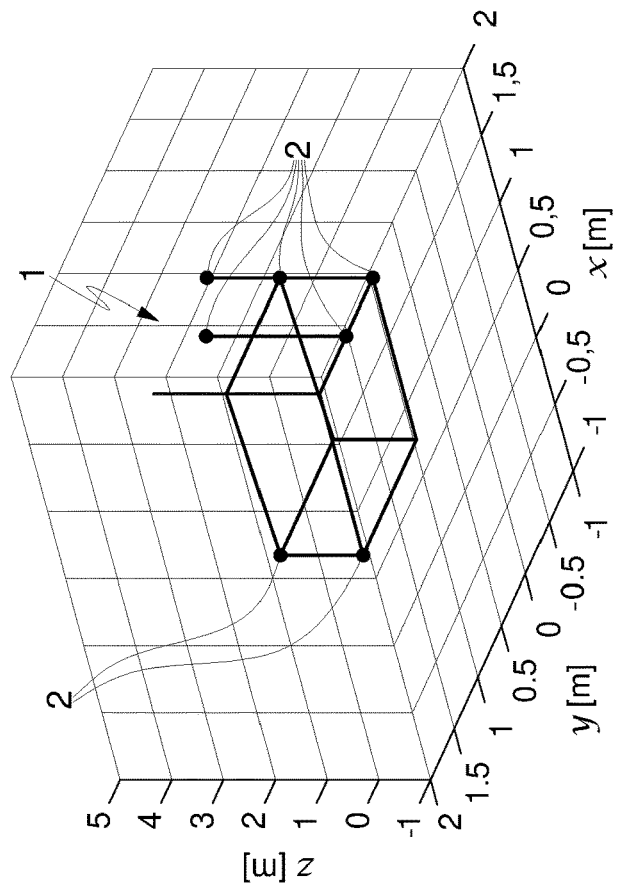
FIGS. 1 to 6 schematically illustrate an AGV, with an illustrative (but generalizable) number of 12 anchors on board, usable in a method according to the present invention with the anchors of a respective sub-unit highlighted.
Figure 2:
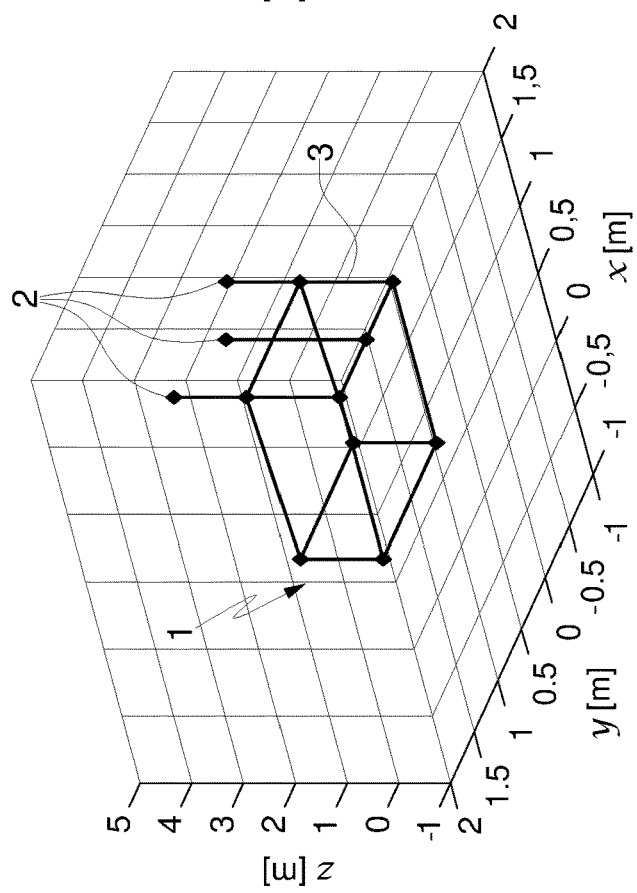
Figure 4:
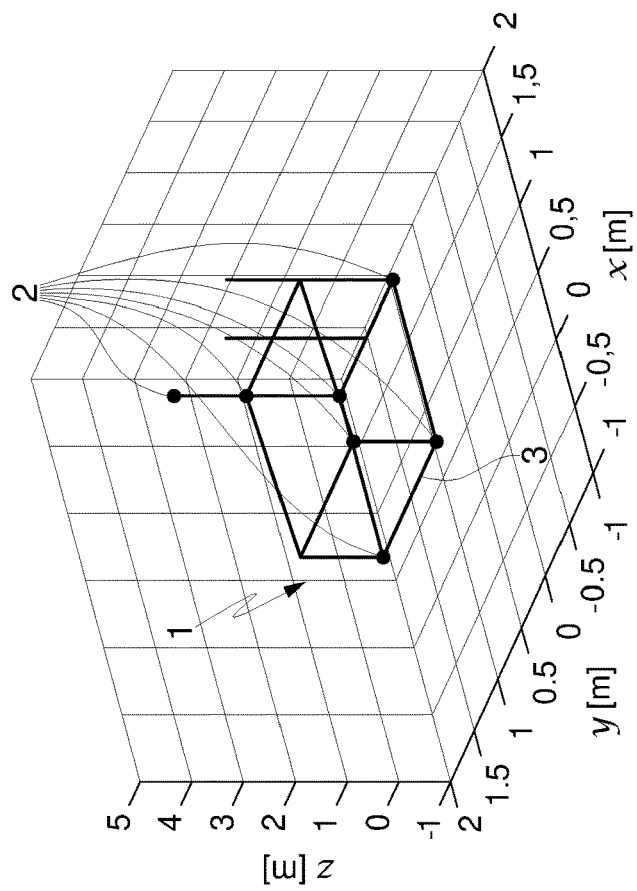
Figure 3:
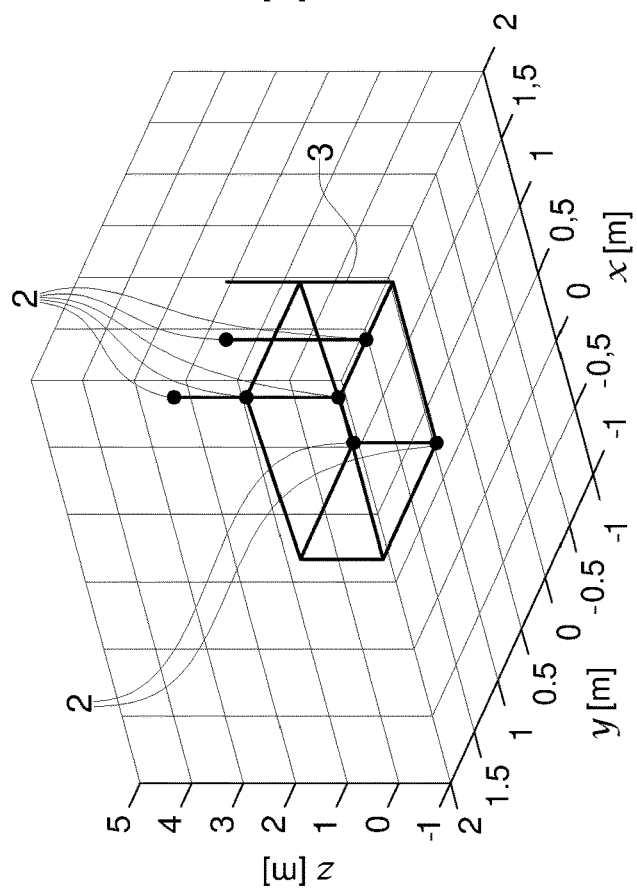
Figure 6:
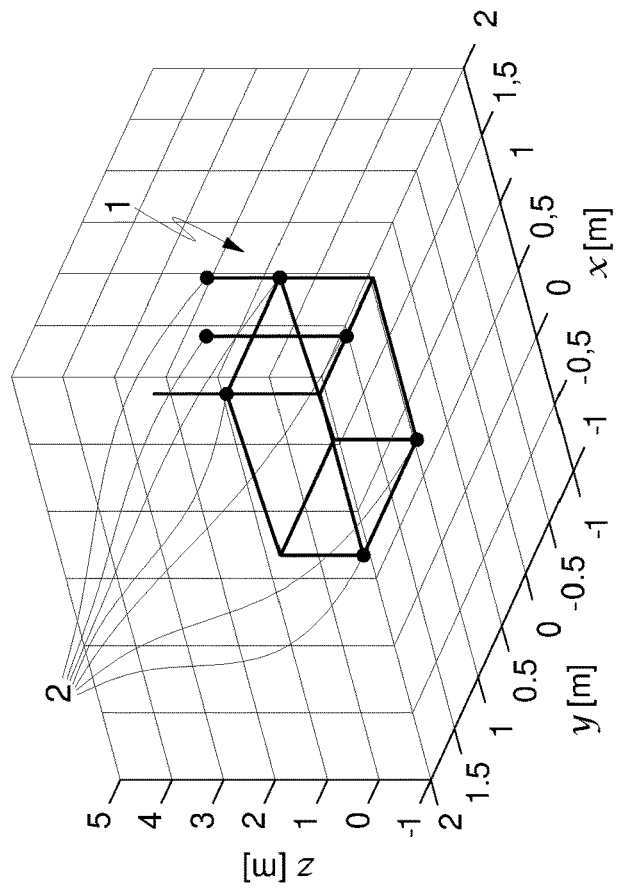
Figure 5:
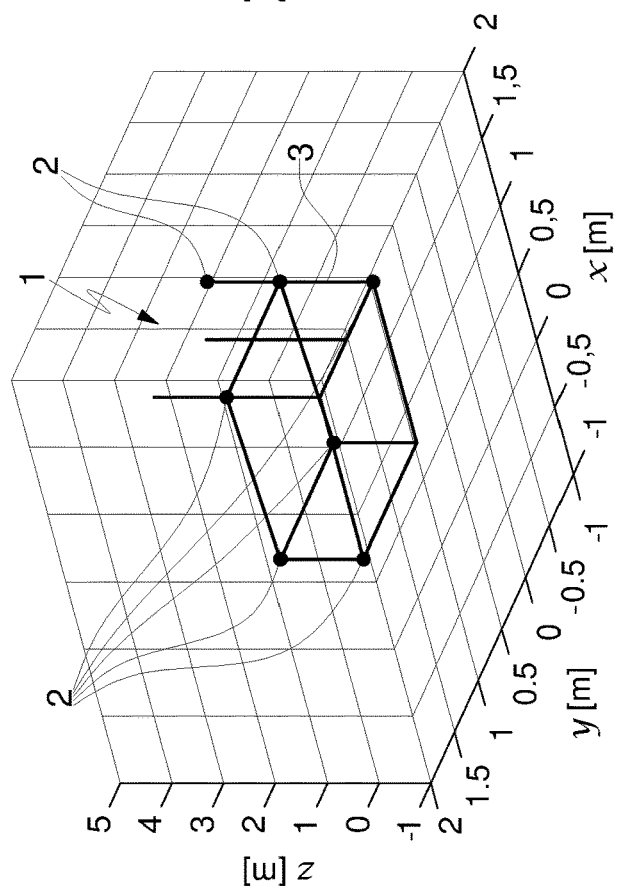

The present invention relates to a method for the localization of a mobile target in an automatic warehouse or in any case for the localization of a mobile target, such as a person or a manual guided vehicle.

Such method first of all provides preparing in the warehouse a mobile target equipped with at least a signal emitter, as well as an automatic guided vehicle 1, such as an LGV (Laser Guided Vehicle) or an AGV equipped with a plurality of anchors 2 for receiving and, if desired, emitting signals.

More specifically, the automatic guided vehicle 1 has a frame 3 mounted on wheels or tracks, while the anchors 2 are mounted at respective points on the frame 3.

The anchors 2 are each equipped with at least one respective antenna designed to receive/emit signals.

In turn, the mobile target 4 is equipped with a marking, which marker includes at least one antenna capable of receiving/emitting signals. More specifically, the target 4 periodically emits, with a sufficiently small period, the signal or signals.

The emission/reception anchors 2 of the vehicle 1 and the marking of the mobile target 4 can use electromagnetic waves of the same type, for example ultra wide band, in the abbreviation UWB, or they can also use other types of transmission signals based on electromagnetic waves, for example Wi-Fi or Bluetooth (trademarks registered by their respective owners).

In particular, the automatic guided vehicle can have a plurality of anchors, for example 5, 6, 7, 10, 12 or more anchors managed by a centralised processing unit on board of the LGV or of the AGV itself, which anchors on board of the vehicle 1 perform the function of fixed anchors which are mutually integral.

In any case, a method according to the present invention, after the steps of preparing at least one automatic guided vehicle 1 and of at least one mobile target 4, provides:
- to emit a signal by the emitter of the mobile target 4,
- to receive the signal emitted by the mobile target 4 by the anchors 2,
- to classify (for example by means of a UWB transmitter as described below), by each of the anchors 2, the signal emitted by the mobile target 4 and received by the anchors 2,
- to make a first rough estimation of the position of the mobile target 4 so as to establish or select the area or quadrant of warehouse around the AGV in which it is located, after defining a suitable number and conformation of such areas,
- to establish or select one or more sub-units or subsets of anchors 2 for the calculation of the accurate position (obtained starting from the signals received through the TDoA method) of a mobile target 4.

In this regard, the subdivision of the warehouse area around the LGV or AGV can be carried out by dividing it into two, three, four or more areas and establishing for each of these areas which list of anchors is more reliable (for example the anchors visible with respect to the mobile target) when receiving the signal emitted by the mobile target 4.

More specifically, supposing to divide the warehouse area around the LGV or AGV into four zones or quadrants, for each of these areas it would be established which list of anchors, for example 5, 6, 7 or 8 out of a total of 10, 12 or 14, it is the most visible in each area or quadrant.

To evaluate the area of the warehouse around the AGV or LGV in which the mobile target 4 is arranged, a first rough estimation of its position is carried out, or rather it is carried out by the centralised processing unit. The first rough estimation is carried out by the centralised processing unit by means of the signals received from all or part of the anchors.

The centralised processing unit, once established, the warehouse area around the AGV or LGV where the mobile target 4 is located based on the rough estimate, identifies one or more sub-units of anchors to carry out a second accurate estimation of the position of the latter. The anchors 2 of each of the sub-units or subsets suitable for estimating the accurate position of the mobile target 4 can have an asymmetrical distribution on the automatic guided vehicle 1, i.e., as a whole.

Regarding to this aspect, in a possible realization of the asymmetry requirement, "asymmetric distribution" means that the anchors are not symmetrical to each other with respect to at least one plane of symmetry which could be a plane of symmetry of the vehicle.

More specifically, considering the vehicle equipped with front, rear and two sides, and identifying a first plane of symmetry, in use, vertical of the vehicle and in which lies the front-rear direction of the vehicle 1 and a second plane of symmetry, in use, vertical and orthogonal to the front-rear direction, the anchors are not symmetrically distributed with respect to the first and/or second plane.

This asymmetry could also or only be assessed with reference to a plane of symmetry of the vehicle in use, vertical and substantially oblique or inclined with respect to the front-rear direction and from one side to the other and/or with reference to a horizontal plane, in particular a horizontal plane of symmetry of the vehicle.

In this regard, assuming the vehicle 1 is equipped with twelve anchors 2, the vehicle can be equipped (see FIG. 1) with the following anchors: one at an upper right front corner, one at an upper left front corner, one at a lower right front corner, one at a lower left front corner, one at a upper right rear corner, one at an upper left rear corner, one at a lower right rear corner, one at a lower left rear corner, one at a lower central rear position, one at a central upper rear position, one at an intermediate left rear position and one at an intermediate right rear position. If desired, to maintain the above mentioned asymmetry requirements, each anchor can be translated along the corresponding corner.

In this case, sub-units of usable anchors may include the anchors as illustrated in figures from 2 to 6.

The evaluation of the aforementioned sub-units can be carried out by means of a simulation method, an experimental estimate or an analytical method, on the basis of the accuracy of the localization of the mobile target obtainable by adopting the anchors belonging to each sub-unit.

Figure 8:
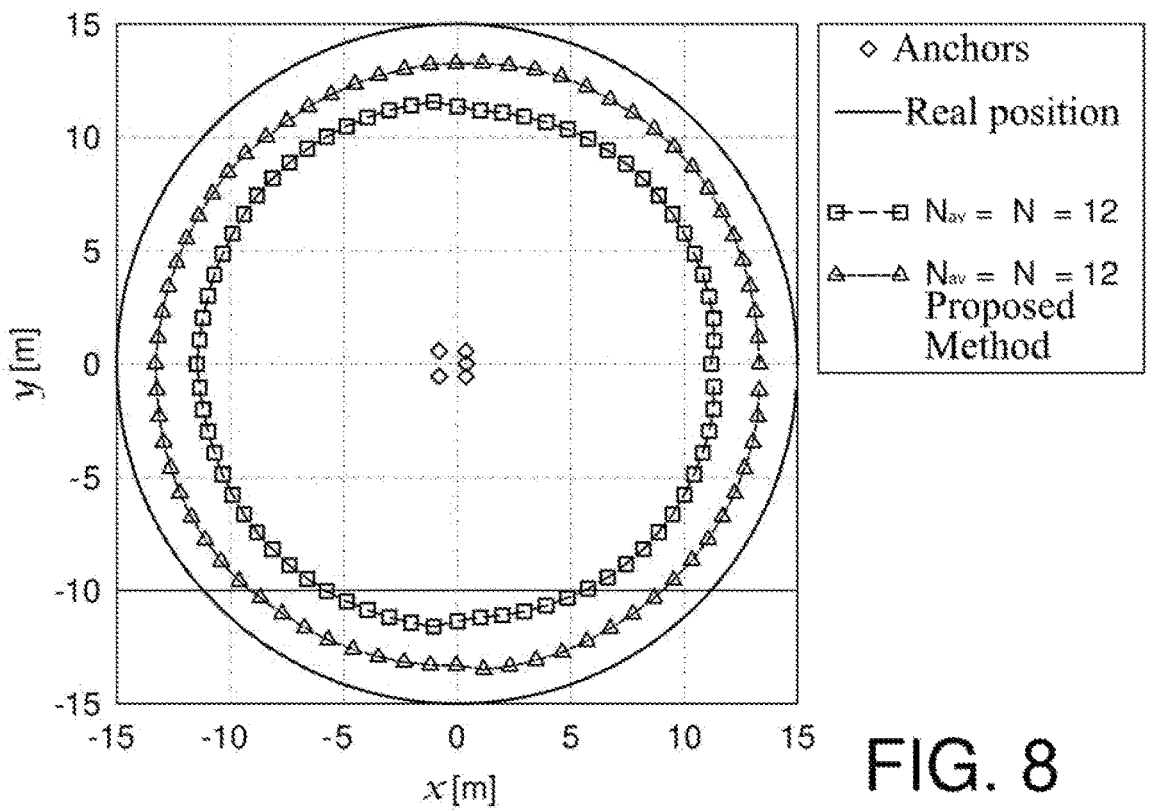
FIG. 8 is a graph that illustrates an estimate of the average position for various positions of a target, comparing a standard TDoA method with evaluations carried out on all twelve anchors present on an AGV and a method according to the present invention with evaluations carried out on sub-units of 7 anchors suitably selected from the 12 anchors available on the AGV.

With reference to the above, the inventors of the present patent application have been able to experimentally and simulatively verify that the position estimation obtained by using sub-units of anchors, in particular sub-units of asymmetrical anchors, is more accurate and reliable of the estimation obtainable using all the anchors. See in this regard the test results shown in FIG. 8.

Figure 7:
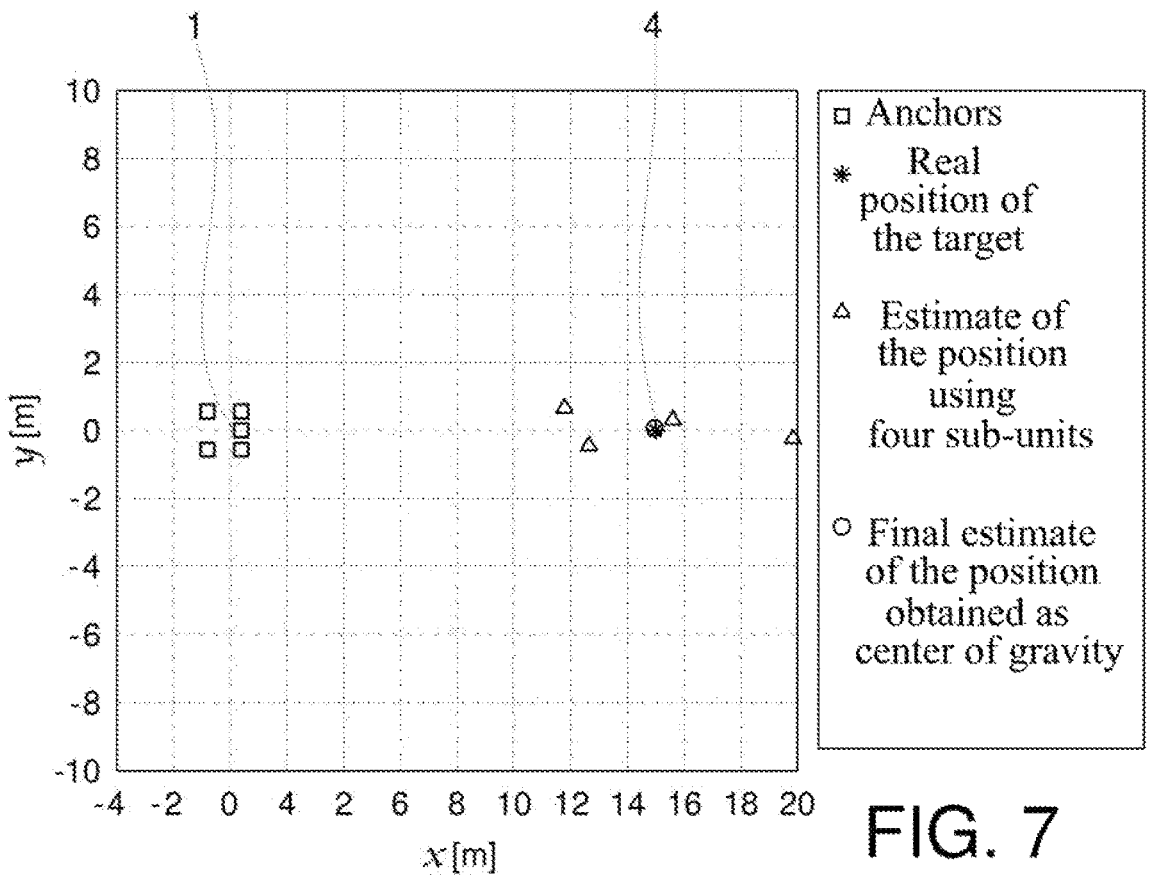
FIG. 7 illustrates an example with position estimates using a localization method which is based on different sub-units of anchors.

These sub-units of anchors are defined by considering the list of anchors 2 assessed or established during the step aimed at establishing or selecting a specific visibility list of anchors 2 best positioned to receive a signal emitted by a mobile target in each zone. If desired, an accurate estimate can be carried out by realizing a weighted average of the values obtained by means of several sub-units of anchors. In this regard, considering $N_s$ sub-units $S1, S2, \ldots, SN_s$ of anchors that provide estimates of the positions $\hat{s}_1, \hat{s}_2, \ldots, \hat{s}_{N_s}$, the final estimate of the position can be obtained as the center of gravity (see FIG. 7) of these positions $$\hat{s}_{df} = \frac{1}{N_s} \sum_{i=1}^{N_s} \hat{s}_i$$

Moreover, in accordance with a method according to the present invention, the signal or signals emitted by the emitter of the mobile target 4 contains/contain a time marking, which allows to evaluate, during the receiving step and assuming that the receiver is perfectly synchronized with the emitter, how long the signal(s) has/have been emitted. In this case, an anchor or first node that receives the signal(s) from this emitter is able to calculate the corresponding time of flight, after an error due to the lack of synchronization between the anchor and the emitter, by the time marking in the emitted signal or in the emitted signals, which time of flight (or its modified version of a quantity proportional to the synchronization error between the anchor and the emitter) is sent to the centralised processing unit on the automatic guided vehicle 1.

If desired, the centralised processing unit uses multilateration units and carries out the following calculation $$\Delta \tau_i = \tau_i - \tau'$$

in which τ' is the time of arrival at a reference anchor, such as the first one receiving the signal, and $\tau_i$ is the time of arrival relative to i-but still different from the reference anchor. On a practical level, the quantity $\Delta\tau_i$ can be calculated, after perfect synchronization between the anchors, as the difference between the instants of reception of the emitter signal by the anchors themselves. In this case, it is no longer necessary for a time marking to be introduced in the emitted signal as described in the previous paragraph.

As an alternative to multilateration units, using trilateration units, the signal emitted by the at least one emitter contains a time marking that allows to evaluate how long the signal has been emitted. In this case, the anchor receives the signal from the emitter and calculates the corresponding time of flight from the time marking in the emitted signal, which time of flight is sent to a processing unit on the automatic guided vehicle.

Moreover, in a method according to the present invention, the position of the mobile target is estimated, during the first rough estimation and/or during the second accurate estimation by means of the solution of the following system of equations $$Es = b$$

wherein the matrix E and the vector b contain the coordinates of the anchors 2 and the estimates of the differences of the time of arrivals of the signal emitted by the mobile target received by the various anchors taken into account.

In this regard, the solution of the above system of equations can be written as $$\hat{s} = E^+ b$$

wherein $E^+$ represents the pseudoinverse matrix obtained by means of the Moore-Penrose pseudoinverse, and wherein $\hat{s}$ represents a solution to the least squares of the system of equations taken into account.

In this case, E it cannot be a square matrix, as better detailed by the formalization in the following paragraph. The system of equations Es=b it can be solved, for example, by the following methods: Linear Hyperbolic Positioning System (LinHPS), Two-Stage Maximum-Likelihood (TSML) or Plane Intersection (PI).

Also, assuming N the available number of anchors 2 on board the vehicle 1 and assuming, purely by way of example, to use the method called LinHPS, E can be a matrix with size $$\binom{N-1}{2} \times 3$$

and b a vector with size $$\binom{N-1}{2}$$

respectively defined as:

$$E = [E_2^T, E_3^T, \ldots, E_{N-1}^T], \quad b = [b_2^T, b_3^T, \ldots, b_{N-1}^T],$$

wherein T it is a transposition operator;

$$E_i = [e_{i,i+1}^T, e_{i,i+2}^T, \ldots, e_{i,N}^T],$$

$$b_i = [b_{i,i+1}, b_{i,i+2}, \ldots, b_{i,N}],$$

$$i = 2, 3, \ldots N - 1$$

with the general terms given by $$e_{ik} = 2c[\Delta\tau_k(a_i - a_1) - \Delta\tau_i(a_k - a_1)]$$

$$b_{ik} = c\left[\Delta\tau_i\left(c^2\Delta\tau_k^2 - \|a_k\|^2\right) + (\Delta\tau_i - \Delta\tau_k)\|a_1\|^2 + \Delta\tau_k\left(\|a_i\|^2 - c^2\Delta\tau_i^2\right)\right]$$

wherein $a_i$ represents the vector of the coordinates of the i-th still receiving, assuming $a_1$ the anchor that is the first to receive the signal transmitted by the mobile target 4.

Possible developments or examples of realization of the steps of a method according to the present invention based on UWB technology will now be described in detail.

In this regard, relating to data collection or reception of the signal issued by the mobile target 4, the same are obtained from a number of anchors N'≤N that receive the signal sent by the target.

The unit of receiving anchors is referred to as $A_{rx}$. For the k-th still receiving $a_k \in A_{rx}$ with k=1, 2, . . . , N', the time marking information received $t_k$ (with appropriate correction determined by the synchronization algorithm) is stored, as well as information relating to the received power.

From a UWB transmitter it is possible to derive the following information, as done for example through the UWB DecaWave chip technology:

an estimate of the power in the first path signal (in dBm), referred to as $P_{fp}^{(k)}$;

an estimate of the received power level (in dBm), indicated as $P_R^{(k)}$.

If an anchor has direct visibility to the target, the communication link or connection is referred to as Line-of-Sight (LOS), otherwise as Non-LOS (NLOS).

In addition, the communication connection between the target and the anchor can be assessed as LOS if the difference $\Delta P = P_R^{(k)} - P_{fp}^{(k)}$ it is small enough, i.e. if most of the received energy is concentrated on the first signal repetition received. If instead ΔP is sufficiently large, the link is referred to as NLOS, since the power of both the first signal and the repetitions is lower. If ΔP is not small enough, but not too large, the channel quality cannot be assessed with sufficient accuracy: this situation is indicated as almost LOS or Almost LOS (ALOS).

In other words

LOS connection if $\Delta P < \beta_1$

ALOS connection if $\beta_1 < \Delta P < \beta_2$

NLOS connection if $\Delta P > \beta_2$ wherein the following values were identified in the experiments conducted: $\beta_1 = 5.5$ dB and $\beta_2 = 8.5$ dB.

After this procedure, the set of anchors with LOS, ALOS, and NLOS links to the target are obtained and referred to as $A_{los}$, $A_{alos}$ and $A_{nlos}$, with $N_{los} = |A_{los}|$, $N_{alos} = |A_{alos}|$ and $N_{nlos} = |A_{nlos}|$.

For simplification purposes, anchors $A_{rx}$ will be assumed as classified and sorted according to the growing parameter $\Delta P$, i.e.

$$A_{rx} = \{a_{rx}^{(1)}, a_{rx}^{(2)}, \ldots a_{rx}^{(N')}\} =$$

$$\left\{ \underbrace{a_{los}^{(1)}, a_{los}^{(2)}, \ldots, a_{los}^{(N_{los})}}_{A_{los}}, \underbrace{a_{alos}^{(1)}, a_{alos}^{(2)}, \ldots, a_{alos}^{(N_{alos})}}_{A_{alos}}, \underbrace{a_{nlos}^{(1)}, a_{nlos}^{(2)}, \ldots, a_{nlos}^{(N_{nlos})}}_{A_{nlos}} \right\}$$

wherein $$\begin{cases} a_{los}^{(i)} \in A & \text{for } i = 1, 2, \ldots, N_{los} \\ a_{alos}^{(i)} \in A & \text{for } i = 1, 2, \ldots, N_{alos} \\ a_{nlos}^{(i)} \in A & \text{for } i = 1, 2, \ldots, N_{nlos} \end{cases}$$

With particular reference to an example of a first rough estimation, the system can carry out a preliminary rough localization using the LinHPS algorithm to determine the angular zone or sector wherein the target is likely to be. In fact, it has been found that although the distance from the target can be inaccurate, the angular error with respect to the real position is always sufficiently accurate. To this end, localization is conducted using information deriving from a subset of cardinality anchors $4 \leq C_{cl} \leq N'$, indicated as $A_{cl}$, established as follows, by way of example:

$$A_{cl} = \begin{cases} A_{los} & \text{if } N_{los} \geq C_{cl} \\ A_{los} \cup A_{alos} & \text{if } N_{los} + N_{alos} \geq C_{cl} \\ A_{rx} & \text{otherwise} \end{cases}$$

Therefore, the number of anchors used for rough localization is:

$$N_{cl} = \begin{cases} N_{los} & \text{if } N_{los} \geq C_{cl} \\ N_{los} \cup N_{alos} & \text{if } N_{los} + N_{alos} \geq C_{cl} \\ N' & \text{otherwise} \end{cases}$$

The position estimate obtained with this rough localization is referred as $\hat{s}_{cl}$. The estimated sector $\hat{S}_{cl}$ it is such that $\hat{s}_{cl}$ belongs to that angular sector. The corresponding predetermined list of visible anchors discussed above is referred to as $A_{vis}$.

With regard to the estimate of the accurate position, it can for example be checked whether one or more anchors belonging to $A_{los}$ are not present in $A_{vis}$, since this would mean that an anchor is declared as LOS according to the above formula, but from geometric considerations it should be NLOS for that specific sector estimated by the rough localization. If this happens, that anchor is removed from the anchors available for estimating the position, since the corresponding measurement is assumed to be too "noisy".

Removed anchors can be collected in the following sub-unit:

$$A_{rem} = \{a_{los}^{(i)} : a_{los}^{(i)} \in A_{los} ea_{los}^{(i)} \notin A_{vis}, i = 1, 2, \ldots, N_{los}\}$$

Therefore, $A'_{los} = A_{los}/A_{rem}$ with $N'_{los} = N_{los} - |A_{rem}|$. The unit of anchors that have received the beacon and are useful for localization becomes:

$$A'_{rx} = \{a_{rx}^{(1)}, a_{rx}^{(2)}, \ldots a_{rx}^{(N'')}\} =$$

$$\left\{ \underbrace{a_{los}^{(1)}, a_{los}^{(2)}, \ldots, a_{los}^{(N'_{los})}}_{A'_{los}}, \underbrace{a_{alos}^{(1)}, a_{alos}^{(2)}, \ldots, a_{alos}^{(N_{alos})}}_{A_{alos}}, \underbrace{a_{nlos}^{(1)}, a_{nlos}^{(2)}, \ldots, a_{nlos}^{(N_{nlos})}}_{A_{nlos}} \right\}$$

wherein $N'' = N'_{los} + N_{alos} + N_{nlos}$.

Hence, $N_s$ (e.g. 1, 2, 3 or more) sub-units or subsets of $A'_{rx}$ are defined according to a heuristic rule, where with $C_s$ is referred the cardinality of the sub-units, with $4 \leq C_s \leq N''$. In particular, by way of example, in the examples $N_s = 3$ have been considered cardinality sub-units $C_s = 7$ o 8.

At this point, considering the unit $A'_{rx}$ of anchors ordered assuming $C_s < N''$, the 3 sub-units are formed according to the following logic:

$$S1 = \{a_{rx}^{(1)}, a_{rx}^{(2)}, \ldots, a_{rx}^{(C_s)}\}$$

$$S2 = \{a_{rx}^{(1)}, a_{rx}^{(2)}, \ldots, a_{rx}^{(C_s-1)}, a_{rx}^{(C_s+1)}\}$$

$$S3 = \{a_{rx}^{(1)}, a_{rx}^{(2)}, \ldots, a_{rx}^{(C_s-2)}, a_{rx}^{(C_s)}, a_{rx}^{(C_s+1)}\}$$

Finally, with regard to accurate localization, the LinHPS algorithm can be applied to each subset, thus obtaining the estimates $\hat{s}_i$ i=1, 2, ..., $N_s$.

At this point, the anomalies are removed and the estimates obtained with the remaining subsets $M \leq N_s$ are averaged, thereby obtaining the final estimate $$\hat{s} = \frac{1}{M} \sum_{i=1}^{M} \hat{s}_i$$

The abnormal values are identified in several ways. First, the sectors to which the estimates $\{\hat{s}_i\}_{i=1}^{N_s}$ belong are calculated and will be referred as $\hat{S}_s^{(i)}$. The following heuristic strategies are proposed to validate the estimates obtained with these subsets and eliminate those that are not consistent with the others.

1. Assuming the preliminary localization produced by the coarse step is valid, the estimate of a subset is considered for the calculation of the position of the mobile target 4 if it falls in the sector $\hat{S}_{cl}$ or in those adjacent to it. For example, if $\hat{S}_{cl} = S3$, the estimate obtained with the i-th subset is valid if $\hat{S}_s^{(i)}$ is such that s varies from 2 to 4.
2. The validity of the preliminary localization by the rough step is judged by verifying its location outside the polytope defined by the anchors. In fact, in reality the mobile device 4 is always outside this polytope. To eliminate the anomalies for the calculation of the accurate estimate, the process follows these 3 sub-cases:

if the preliminary estimate is valid, the same rule of case 1 is applied;

if the preliminary estimate is not valid, the estimates of the subsets are considered for the calculation of the position of the mobile target 4 if they all fall into a single sector, regardless of whether or not this sector is $\hat{S}_{cl}$;

if the preliminary estimate is not valid, the estimate of a subset is considered for the calculation of the position of the mobile target 4 if it falls within the sector $\hat{S}_{cl}$ or in those with a maximum distance of 2 sectors (from left or right). For example, if $\hat{S}_{cl}$=S3, the estimate obtained with the i-th subset is valid if $\hat{S}_s^{(i)}$ it is such that s varies from 1 to 5. This condition is more relaxed than that of case 1 to deal with the greater noise of this situation.

3. All estimates are considered valid.

In the first two strategies it may happen that none of the subunits provide an estimate consistent with the angular sector obtained from the rough localization, thus leading to a lack of localization. However, discarding subsets with poor performance ensures greater accuracy of the final estimate. On the other hand, the third strategy always localizes as soon as $N_s$ subsets are available. In this sense, the performance with the third strategy can be considered as a reference point, since no missing localization occurs at the price of (possibly) reduced positioning accuracy.

The object of the present invention is also an automatic guided vehicle 1 for estimating the position of a mobile target 4 in a warehouse, the vehicle 1 comprising a centralised processing unit, as well as at least 5, 6, 7, 10, 12 or more anchors managed by such centralised processing unit, which anchors 2 being equipped with respective antennas designed to detect a signal emitted by a signal emitter of a mobile target.

In this case, the centralised processing unit is designated for carrying out the above indicated steps.

As it will be confirmed, thanks to a method according to the present invention, it is possible to locate the position of a mobile target more accurately and by reducing the estimation error, such as a person or a manual guided vehicle, avoiding among other things collisions between an AGV and those targets.

This in particular can be achieved thanks to a "two-steps estimation" procedure, according to which after a "rough" estimate between the anchors system and the target, which is used to decide the quadrant or area around the AGV or LGV wherein are found the target and the corresponding list of visible anchors, a choice of the sub-unit or sub-units which allows/allow to make a "fine" estimate of the position is carried out.

Modifications and variants of the invention are possible within the scope of protection defined by the claims.

The invention claimed is:

1. A method for localization of a mobile target in a warehouse comprising the following steps:
providing in said warehouse a mobile target provided with at least one signal emitter,
emitting a signal by said at least one signal or signals emitter,
providing in said warehouse an automatic guided vehicle provided with a plurality of anchors for receiving signals, said anchors being provided with respective antennas designed to detect the signal emitted by said signal emitter, at least one antenna being provided for each anchor,
receiving said at least one signal emitted by the mobile target by said anchors,
classifying, by each of said anchors, the signal/s emitted by said mobile target and received by said anchors,
providing a first rough estimation of a position of the mobile target so as to establish or select an area or quadrant of warehouse around the automatic guided vehicle in which it is located, after defining a suitable number and conformation of such areas,
conducting a second accurate estimate of the position of said mobile target by means of one or more sub-units or subsets of anchors (obtained starting from the signals received through a TDoA method).

2. The method according to claim 1, wherein said sub-units are selected by means of a simulative method, a test estimation, or an analytical method.

3. The method according to claim 1 wherein said first rough estimate is carried out by obtaining a weighted average of values obtained by means of all or part of the anchors.

4. The method according to claim 1, wherein considering $N_s$ sub-units S1, S2, . . . , SN$_s$ of anchors that give estimates of the positions $\hat{s}_1, \hat{s}_2, \ldots, \hat{s}_{N_s}$, the final estimate of the position can be obtained as a barycentre of such positions according to the following expression:

$$\hat{s}_{df} = \frac{1}{N_s}\sum_{i=1}^{N_s}\hat{s}_i.$$

5. The method according to claim 1, wherein the anchors of each of said sub-units have an asymmetrical distribution on said automatic guided vehicle.

6. The method according to claim 1, wherein said mobile target is a person or a manual guided vehicle.

7. The method according to claim 1, wherein said anchors are 12, and said sub-units comprise between 6 and 8 anchors.

8. The method according to claim 1, wherein said signal emitted by said at least one emitter contains a time marking which allows to evaluate how long said signal has been emitted and wherein said anchor receives the signal from said emitter and calculates a corresponding time of flight from the time marking in the emitted signal, the time of flight being sent to a processing unit on the automatic guided vehicle.

9. The method according to claim 1, wherein a processing unit uses multilateration units and carries out the following calculation $$\Delta\tau_i = \tau_i - \tau'$$

wherein $\tau'$ is a time of arrival measured at a reference anchor, as a first measurement to arrive, and $\tau_i$ is the time of arrival regarding the i-eth anchor other than the reference anchor.

10. The method according to claim 9, wherein, assuming N the available number of anchors on board the vehicle and assuming to use the method called LinHPS, E can be a matrix with size $$\binom{N-1}{2}\times 3$$

and b vector with size $$\binom{N-1}{2}$$

respectively defined as:

$$E = [E_2^T, E_3^T, E_{N-1}^T], \quad b = [b_2^T, b_3^T, b_{N-1}^T],$$

wherein T it is a transposition operator;

$$E_i = [e_{i,i+1}^T, e_{i,i+2}^T, \ldots, e_{i,N}^T],$$
$$b_i = [b_{i,i+1}, b_{i,i+2}, \ldots, b_{i,N}],$$
$$i = 2, 3, \ldots N-1$$

with the general terms given by $$e_{ik} = 2c[\Delta\tau_k(a_i - a_1) - \Delta\tau_i(a_k - a_1)]$$
$$b_{ik} = c[\Delta\tau_i(c^2\Delta\tau_k^2 - \|a_k\|^2) + (\Delta\tau_i - \Delta\tau_k)\|a_1\|^2 + \Delta\tau_k(\|a_i\|^2 - c^2\Delta\tau_i^2)]$$

where $a_i$ represents the vector of the coordinates of the i-eth receiving anchor, assuming $a_1$ is the anchor that is the first to receive the signal transmitted by the mobile target.

11. The method according to claim 1, wherein the position of said mobile target is estimated by solving the following system of equations $$Es = b$$

wherein the matrix E and the vector b contain the coordinates of the anchors and estimates of differences of times of arrival of the signal emitted by the mobile target received by the various anchors taken into account; the solution of the system of equations can be written as $$\hat{s} = E^+ b$$

wherein E+ represents the pseudoinverse matrix obtained by means of the Moore-Penrose pseudoinverse (E not being a square matrix) and wherein Ŝ represents a solution to the least squares (LS) of the system of equations taken into account.

12. The method according to claim 11, wherein the system of equations Es=b can be solved through one of the following methods: Linear Hyperbolic Positioning System (LinHPS), Two-Stage Maximum-Likelihood (TSML) or Plane Intersection (PI).

13. An automatic guided vehicle for estimating a position of a mobile target in an automated warehouse, which vehicle comprises a centralised processing unit, as well as 5 or more anchors managed by said centralised processing unit, said anchors being provided with respective antennas designed to detect a signal emitted by a signal emitter of a mobile target, said centralised processing unit being designated for:

establishing or selecting a specific sub-unit of anchors for measuring a position of a mobile target in each area of the warehouse around the automatic guided vehicle, providing a first rough estimation of the position of the mobile target so as to establish or select the area or quadrant of warehouse around the automatic guided vehicle in which it is located, after defining a suitable number and conformation of such areas, conducting a second accurate estimate of the position of said mobile target by means of one or more sub-units or subsets of anchors (obtained starting from the signals received through a TDoA method).

14. The vehicle according to claim 13, wherein said centralised processing unit is designed for carrying out said first rough estimate obtaining a weighted average of the obtained values through said sub-units of anchors.

15. The vehicle according to claim 14, wherein considering $N_s$ sub-units S1, S2, ... SNs, of anchors which give estimates of the positions $\hat{s}_1, \hat{s}_2, \ldots, \hat{s}_{N_s}$ a final estimate of the position can be obtained as a barycentre of such positions according to the following expression:

$$\hat{s}_{df} = \frac{1}{N_s}\sum_{i=1}^{N_s} \hat{s}_i$$

$$\hat{s}_{df} = \frac{1}{N_s}\sum_{i=1}^{N_s} \hat{s}_i.$$

16. The vehicle according to claim 13, wherein the anchors of each of said sub-units have an asymmetrical distribution on said automatic guided vehicle.

17. The vehicle according to claim 13, wherein the anchors are not symmetrical to each other with respect to a symmetry plane of the vehicle considering the vehicle to be provided with front, rear and two sides, and identifying a first vertical, in use, symmetry plane of the vehicle and on which a front-rear direction of the vehicle lies and a second symmetry plane, in use, vertical and orthogonal to the front-rear direction, the anchors are not distributed symmetrically with respect to the first and/or to the second symmetry plane.

18. The vehicle according to claim 13, wherein said anchors are 12, and said sub-units comprise between 6 and 8 anchors.

19. The vehicle according to claim 13, wherein the position of said mobile target is estimated by solving the following system of equations:

$$Es = b$$

wherein the matrix E and the vector b contain the coordinates of the anchors and the estimates of the differences of the times of arrival of the signal emitted by the mobile target received by the various anchors taken into account, the solution of the system of equations possibly being written as $$\hat{s} = E^+ b$$

wherein E+ represents the pseudoinverse matrix obtained by means of the Moore-Penrose pseudoinverse, E not being a square matrix, and wherein Ŝ represents a solution to a least squares (LS) of the system of equations taken into account.

20. The vehicle according to claim 19, wherein the system of equations Es=b can be solved through one of the following methods: Linear Hyperbolic Positioning System (LinHPS), Two-Stage Maximum-Likelihood (TSML) or Plane Intersection (PI).

21. The vehicle according to claim 19, wherein, assuming N the number of available anchors on board the vehicle and assuming to use the method called LinHPS, E can be a matrix with size $$\binom{N-1}{2} \times 3$$

and b a vector with size $$\binom{N-1}{2}$$

respectively defined as:

$$E = [E_2^T, E_3^T, E_{N-1}^T], \quad b = [b_2^T, b_3^T, b_{N-1}^T],$$

wherein T it is a transposition operator;

$$E_i = [e_{i,i+1}^T, e_{i,i+2}^T, \ldots, e_{i,N}^T],$$
$$b_i = [b_{i,i+1}, b_{i,i+2}, \ldots, b_{i,N}],$$
$$i = 2, 3, \ldots N-1$$

with the general terms given by $$e_{ik} = 2c[\Delta\tau_k(a_i - a_1) - \Delta\tau_i(a_k - a_1)]$$
$$b_{ik} = c[\Delta\tau_i(c^2\Delta\tau_k^2 - \|a_k\|^2) + (\Delta\tau_i - \Delta\tau_k)\|a_1\|^2 + \Delta\tau_k(\|a_i\|^2 - c^2\Delta\tau_i^2)]$$

where $a_i$ represents the vector of the coordinates of the i-eth receiving anchor, assuming $a_1$ is the anchor that is the first to receive the signal transmitted by the mobile target.

* * * * *